United States Patent Office 3,515,412
Patented June 2, 1970

3,515,412
THREE-POINT HITCH
Ludwig Muncke, Morlenbach, and Josef Buchmüller and Otto Hartlieb, Mannheim, Germany, assignors to Deere & Company, Moline, Ill., a corporation of Delaware
Filed Mar. 5, 1968, Ser. No. 710,483
Claims priority, application Germany, Mar. 9, 1967, D 52,485
Int. Cl. B60d 1/00
U.S. Cl. 280—461                                9 Claims

ABSTRACT OF THE DISCLOSURE

A variable length lift link for a three-point hitch and adjusting means therefor which can be manipulated from the operator's station even though a portion of the tractor structure, for example, the fuel tank, is located behind the operator's station in a position overlying the lift arms and lift links of the three-point hitch.

BACKGROUND OF THE INVENTION

This invention relates generally to a tractor-mounted three-point hitch having at least one lift link which is of variable length, and more particularly relates to the variable length lift link and the mechanism for varying the length.

When using an implement which is integrally mounted to the tractor by a three-point hitch, it is often necessary to level the implement or change its side-to-side attitude with respect to the tractor. To accomplish this, it has been customary to construct one of the lift links with a rod threadably received by a tubular housing. A crank was provided to rotate the rod and thereby thread the same into or out of the tubular housing to vary the length of the lift link. It has also been customary to locate the tubular housing at the bottom of the lift link and the rod at the top of the lift link so that the crank handle would be within easy reach from the operator's station.

In some special use tractors, for example, a vineyard tractor, it is desirable to keep the overall length of the tractor at a minimum in order to increase maneuverability. One method of reducing the length of the tractor is to mount a portion of the tractor structure which is generally located forwardly of the operator's station, for example, the tractor fuel tank, in the unused space behind the operator's station and overlying the lift arms and lift links of the three-point hitch. However, as soon as this available space is used, the adjusting mechanism for varying the length of the lift link is no longer accessible from the operator's station, and the operator is forced to dismount in order to make any adjustments.

SUMMARY OF THE INVENTION

It is an object of the present invention to provide a tractor-mounted three-point hitch provided with an adjustable lift link and a mechanism for varying its length which extends into close proximity to the tractor operator's station.

A further object of the present invention is to provide a tractor-mounted three-point hitch provided with an adjustable lift link and a mechanism for varying its length which is accessible from the tractor operator's station even though the lift arms and lift links of the three-point hitch are inaccessible from the operator's station.

Still another object of the present invention is to provide a tractor-mounted three-point hitch provided with an adjustable lift link and a mechanism for varying its length in which the adjusting mechanism can be easily reached from the tractor operator's station whether the draft links of the three-point hitch are raised or lowered.

According to the invention the mechanism for varying the length of the lift link is connected to the lift link through a gear box provided in the region of the point of connection of the lift link to the draft link and extends into close proximity to the operator's station. If some of the tractor structure, for example, the fuel tank, is mounted behind the tractor seat in a position overlying the lift arms and the lift links of the three-point hitch, the adjusting mechanism can extend behind and above such structure to a position where it is accessible to the operator by reaching back across the top of such structure. In this manner the space available on the tractor can be utilized to the utmost and the tractor length kept at a minimum while the length of the lift link is still adjustable from the operator's station.

The above objects and advantages and details of construction of the present invention will become apparent from a reading of the following detailed description taken in conjunction with the accompanying drawings.

DESCRIPTION OF THE PREFERRED EMBODIMENT

Figure 1:
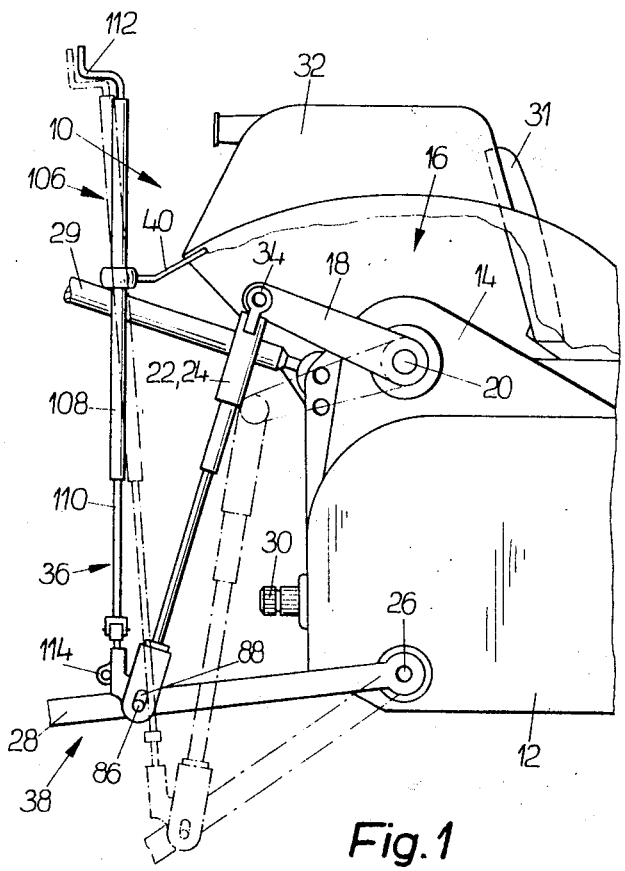
FIG. 1 is a side elevational view of the rear portion of a tractor provided with a three-point hitch constructed in accordance with the principles of the present invention, the broken lines illustrating the three-point hitch in a lowered position.

Referring to the drawings, the rear end portion of a tractor is indicated generally at 10 and includes a transmission housing 12 and a control housing 14 for a three-point hitch power lift system indicated generally at 16. The power lift system 16 includes a pair of lift arms 18 which are secured to the opposite ends of a rockshaft 20 which is rotatably journaled in the control housing 14. The upper ends of a pair of lift links 22 are connected to the lift arms 18 while the lower ends of the lift links 22 are connected to draft links 28. The draft links 28 are mounted on the transmission housing 12 by a pair of pins 26 which allow for vertical movement of the draft links 28 so that the draft links 28 can be raised or lowered by the lift arms 18 and lift links 22. The upper link of the three-point hitch is indicated at 29 and is illustrated as being secured to the rear side of the control housing 14. The draft links 28 are secured to the sides of the transmission housing 18 so as to not interfere with the conventional centrally positioned power take-off shaft 30.

In the tractor illustrated, the fuel tank 32 is positioned behind the opreator's seat 31 in a position overlying the points of connection of the lift links 22 to the lift arms 18. The fuel tank 32 is of a width to extend over the entire width of the tractor. By positioning the fuel tank as illustrated, the length of the tractor forwardly of the driver's station can be reduced and thereby increase the maneuverability of the tractor. To enable the operator to adjust the length of one of the lift links 22, an adjusting mechanism 36 is provided at the bottom end 38 of one lift link 22 and extends up behind the fuel tank to a position where it can be easily reached from the driver's seat 31. The upper end of the adjusting mechanism 36 is held in position by a mounting bracket 40.

Figure 2:
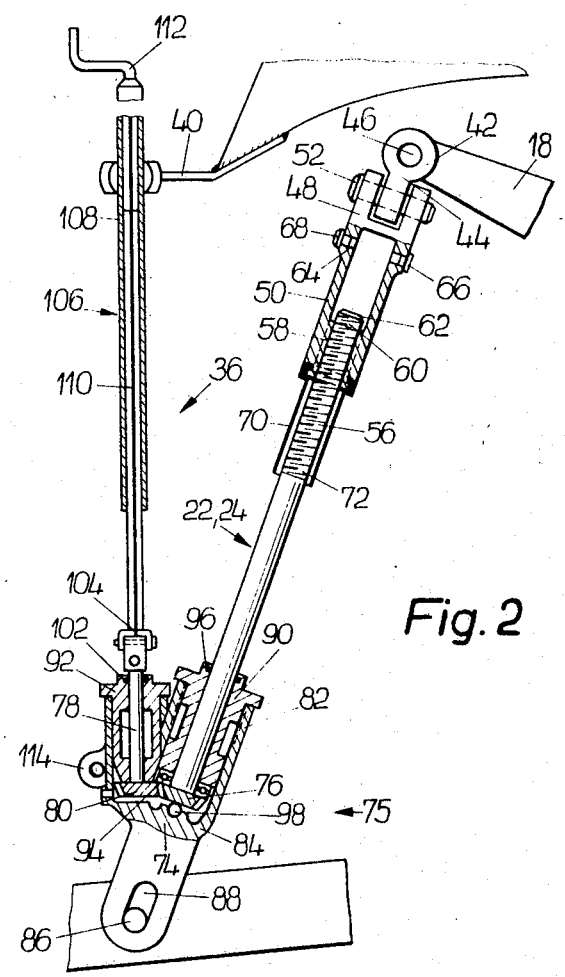
FIG. 2 is an enlarged view, partly in section, of the adjustable lift link and mechanism for varying its length illustrated in FIG. 1.

As best illustrated in FIG. 2, the adjustable lift link 22 is connected to the lift arm 18 through an intermediate link 34. One end 42 of the intermediate link 34 is pivotally attached to the lift arm 18 by a pivot pin 46 while the opposite end 44 of the intermediate link is straddled by and pivoted to an upper forked end 48 of a tubular housing 50 by a pivot pin 52. The pivot pins 46 and 52 are disposed at right angles to one another to allow for universal movement of the lift link 22. The tubular housing 50 is provided with internal threads 58 to receive a threaded rod 56. To prevent accidental removal of the threaded rod 56 from the housing 50, a pin 60 is driven into the upper extreme end 62 of the rod 56. To facilitate the insertion of the pin 62, the upper end of the tubular housing 50 is provided with a through passage 64. After the pin 62 has been inserted through the passage 64, one end of the passage 64 is closed off by a plug 66, while the other end of the passage 64 is provided with a grease fitting 68. The upper end of a protective sleeve 70 is secured to the lower end of the tubular housing 50 and extends down along the rod 56 to protect the threaded portion 72 of the threaded rod 56 against dirt or the like. The sleeve 70 can be made of any suitable material such as metal or plastic.

A bevel gear 76 is integrally mounted on the lower end 74 of the threaded rod 56. The bevel gear 76 forms part of a gear mechanism indicated generally at 75 and is in meshing engagement with a second bevel gear 80 which is mounted on a lower end of a short shaft 78. The two bevel gears 76 and 80 are disposed at the juncture of a pair of converging bores provided in a casing 82. A lower forked end 84 of the casing 82 is secured to the draft link 28 by a pin 86 which extends through the draft link 28 and slots 88 provided in the forked end of the casing. The lower end of the threaded rod 56 and the short shaft 78 are journaled in the converging bores by cylindrical bearing supports or bushings 90 and 92, respectively. The bushings 90 and 92 are secured in the casing 82 in any suitable manner to prevent axial movement, for example, by screw connections. A thrust bearing 94 is positioned between the bushing 90 and the bevel gear 76 while a single ball 98 is positioned between the bevel gear 76 while a single ball 98 is positioned between the bevel gear 76 and the bottom of the casing 82 to absorb shocks. The thrust bearing 94 and the ball 98 prevent axial movement of the threaded rod 56 within the casing 82. The bushings 90 and 92 are provided with sealing rings 96 and 102, respectively, which surround the threaded rod 56 and the short shaft 78, respectively, to prevent foreign matter from entering the gear mechanism.

The upper end of the short shaft 78 is connected to the adjusting mechanism 36 by a universal joint 104. In order to accommodate vertical movement of the draft links 28, the adjusting mechanism 36 is provided with a telescopic portion indicated generally at 106. The telescopic portion 106 of the adjusting mechanism includes a square tube 108 and a square rod 110 which is slidably mounted within the tube 108 and pivotally connected to the shaft 78 by the universal joint 104. The upper end of the tube 108 is provided with a crank 112 for manual manipulation of the adjusting mechanism 36. In order to maintain the crank 112 in a position where it can be easily reached by the operator while remaining in the tractor seat, the mounting bracket 40 is provided with a carrier that includes a ball and socket and the tube 108 extends through the ball portion thereof. Suitable abutments provided on the tube 108 will prevent the tube from moving axially within the ball. The bracket 40 is mounted to any suitable structure on the tractor 10, for example, on the fender.

The casing 82 is also provided with a bracket 114. The purpose of the bracket 114 is to secure one end of a spring which is connected between the lift links to hold the draft links 28 in their various positions.

From the above description and from the illustrations, it can be seen that the operator can easily adjust the length of one of the lift links 22 by reaching back across the fuel tank 32 and rotating the crank 112. Rotation of the crank 112 will cause rotation of a threaded shaft 56 and screw the threaded shaft 56 either into or out of the tubular housing 50 and thereby vary the length of the lift link.

While only a single preferred embodiment of the invention has been described and illustrated, various changes and modifications well within the spirit and scope of the present invention will be apparent to those skilled in the art and can be made without departing from the underlying principles of the invention.

What is claimed is:

1. In a tractor having an operator's station, vertically movable power-operated draft linkage including a lift arm, a lower link and selectively vertically adjustable and settable lift link means interconnecting the arm and link for power-operated movement of the linkage or for vertical adjustment of the lower link relative to the arm, and additional tractor structure positioned behind the operator's station and above the lift arm, the improvement comprising a drivable element carried by and connected to and for adjusting the lift link means, a driving element connected to the drivable element, the driving element passing to the rear of and above the additional structure and extending into close proximity to the operator's station, and means guidingly supporting the driving element on the tractor adjacent to the operator's station to accommodate power-operated movement of the draft linkage.

2. The invention defined in claim 1 in which the lift link means includes upper and lower parts connected respectively to the lift arm and to the lower link and coaxially screw-threaded together for relative rotation so as to effect relative adjustment of the arm and link, a gear housing proximate to the lower link and journaling the lower part, gearing in the housing and including a first gear on the lower part and a second gear on the drivable element, said drivable element also being journaled in the housing.

3. The invention defined in claim 2, in which the drivable element includes a lower shaft journaled in and projecting upwardly from the housing and connected to and rotatable by the driving element.

4. The invention defined in claim 2, including thrust bearings in the housing respectively above and below the first gear.

5. The invention defined in claim 4, in which the thrust bearing below the first gear is a single ball.

6. The invention defined in claim 2, in which the housing has a pair of bores respectively on downwardly converging axes, and a pair of cylindrical bearing supports respectively in the bores, one support journaling the lower part and the other support journaling the drivable element.

7. For a tractor having an operator's station and vertically movable power-operated draft linkage including an upper station-proximate lift arm, a lower link spaced below said station and selectively vertically adjustable and settable lift link means interconnecting the arm and link for power-operated movement of the linkage or for vertical adjustment of the lower link relative to the arm, the improvement comprising a drivable element carried by and connected to and for adjusting the lift link means, a driving element connected to the drivable element and extending into close proximity to the operator's station, means guidingly supporting the driving element on the tractor adjacent to the operator's station to accommodate power-operated movement of the draft linkage, the driving element including a generally upright rotatable first shaft connected to the drivable element, and the supporting means including a rotatable second shaft coaxially connected to the first shaft for rotation therewith and for relative axial movement and a carrier on the tractor rotatively mounting the second shaft and fixing said second shaft against axial movement.

8. The invention defined in claim 7, in which the carrier includes a universal mounting for said second shaft.

9. The invention defined in claim 8, in which the universal mounting is a ball and socket means.

References Cited

UNITED STATES PATENTS

| | | | |
|---|---|---|---|
| 2,616,349 | 11/1952 | Lindeman et al. | 280—461 |
| 2,667,745 | 2/1954 | Smith et al. | 172—448 X |
| 2,775,180 | 12/1956 | Du Shane | 172—448 X |
| 2,865,657 | 12/1958 | Clarke | 280—461 |

BENJAMIN HERSH, Primary Examiner

J. A. PEKAR, Assistant Examiner

U.S. Cl. X.R.

172—448